(12) United States Patent
Baer et al.

(10) Patent No.: US 10,417,991 B2
(45) Date of Patent: Sep. 17, 2019

(54) MULTI-DISPLAY DEVICE USER INTERFACE MODIFICATION

(71) Applicant: Microsoft Technology Licensing, LLC, Redmond, WA (US)

(72) Inventors: Matthias Baer, Seattle, WA (US); Bryan K. Mamaril, Seattle, WA (US); Kyle T. Kral, Duvall, WA (US); Kae-Ling J. Gurr, Seattle, WA (US); Ryan Whitaker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 15/680,884

(22) Filed: Aug. 18, 2017

(65) Prior Publication Data
US 2019/0057671 A1   Feb. 21, 2019

(51) Int. Cl.
| | |
|---|---|
| G06F 3/01 | (2006.01) |
| G06F 3/14 | (2006.01) |
| G09G 5/00 | (2006.01) |
| G09G 5/14 | (2006.01) |
| G09G 5/373 | (2006.01) |
| G06F 3/0481 | (2013.01) |
| G06F 3/0488 | (2013.01) |

(52) U.S. Cl.
CPC ........... G09G 5/005 (2013.01); G06F 3/0481 (2013.01); G06F 3/1446 (2013.01); G09G 5/14 (2013.01); G09G 5/373 (2013.01); *G06F 3/017* (2013.01); *G06F 3/04883* (2013.01); *G09G 2354/00* (2013.01); *G09G 2356/00* (2013.01)

(58) Field of Classification Search
CPC ...... G06F 1/1641; G06F 3/1446; G06F 3/147; H04N 21/4122; G09G 2300/026; G09G 2360/04
See application file for complete search history.

(56) References Cited

U.S. PATENT DOCUMENTS

| | | |
|---|---|---|
| 5,263,134 A | 11/1993 | Paal et al. |
| 5,455,906 A | 10/1995 | Usuda |
| 8,976,140 B2 | 3/2015 | Hirata |

(Continued)

OTHER PUBLICATIONS

"International Search Report and Written Opinion Issued in PCT Application No. PCT/US18/038380", dated Sep. 28, 2018, 12 Pages.

(Continued)

*Primary Examiner* — Haixia Du
(74) *Attorney, Agent, or Firm* — International IP Law Group, PPLC (57) ABSTRACT

A system for modifying a user interface in a multi-display device environment described herein can include a processor and a memory storing instructions that cause the processor to detect a number of display screens coupled to the system. The plurality of instructions can also cause the processor to split an image to generate sub-images based on the number of display screens and a bezel size corresponding to each of the display screens, the sub-images to exclude portions of the image corresponding to the bezel size of each of the display screens. Additionally, the plurality of instructions can cause the processor to resize each of the sub-images based on a display size of each of the display screens and display the image by transmitting the sub-images to the display screens.

18 Claims, 4 Drawing Sheets

(56) References Cited

U.S. PATENT DOCUMENTS

| | | |
|---|---|---|
| 9,471,150 B1 | 10/2016 | Addaguduru |
| 9,606,723 B2 | 3/2017 | Selim |
| 10,073,613 B2 | 9/2018 | Liao et al. |
| 2006/0132474 A1 | 6/2006 | Lam |
| 2009/0058842 A1 | 3/2009 | Bull et al. |
| 2009/0070670 A1 | 3/2009 | Kishi |
| 2009/0327964 A1 | 12/2009 | Mouilleseaux et al. |
| 2010/0083154 A1 | 4/2010 | Takeshita |
| 2011/0047459 A1 | 2/2011 | Van Der Westhuizen |
| 2011/0169749 A1 | 7/2011 | Ganey et al. |
| 2011/0209102 A1* | 8/2011 | Hinckley ............... G06F 3/0483 715/863 |
| 2011/0239157 A1 | 9/2011 | Lin et al. |
| 2011/0316807 A1 | 12/2011 | Corrion |
| 2012/0044164 A1 | 2/2012 | Kim et al. |
| 2012/0050314 A1* | 3/2012 | Wang ................... G06F 3/1446 345/619 |
| 2012/0072867 A1 | 3/2012 | Schlegel |
| 2012/0139815 A1* | 6/2012 | Aono ................... G06F 1/1616 345/1.3 |
| 2012/0223898 A1 | 9/2012 | Watanabe et al. |
| 2012/0289290 A1 | 11/2012 | Chae et al. |
| 2012/0320158 A1* | 12/2012 | Junuzovic ............... G06F 3/017 348/46 |
| 2013/0009903 A1 | 1/2013 | Shiota |
| 2013/0019182 A1 | 1/2013 | Gil et al. |
| 2013/0103446 A1 | 4/2013 | Bragdon et al. |
| 2013/0176255 A1 | 7/2013 | Kim et al. |
| 2013/0237288 A1 | 9/2013 | Lee |
| 2013/0285933 A1 | 10/2013 | Sim et al. |
| 2014/0033119 A1 | 1/2014 | Kim et al. |
| 2014/0055390 A1 | 2/2014 | Lim et al. |
| 2014/0092140 A1 | 4/2014 | Wadhwa et al. |
| 2014/0160073 A1 | 6/2014 | Matsuki |
| 2014/0168277 A1* | 6/2014 | Ashley ................... G06F 3/1446 345/672 |
| 2014/0181739 A1 | 6/2014 | Yoo |
| 2014/0189583 A1 | 7/2014 | Yang |
| 2014/0289642 A1 | 9/2014 | Prasad |
| 2015/0046871 A1 | 2/2015 | Lewis |
| 2015/0067589 A1 | 3/2015 | Xiao et al. |
| 2015/0084885 A1 | 3/2015 | Kawamoto |
| 2015/0279037 A1* | 10/2015 | Griffin ................... G06F 3/1446 345/1.3 |
| 2015/0331594 A1 | 11/2015 | Terada et al. |
| 2015/0338998 A1 | 11/2015 | Chathoth et al. |
| 2015/0378502 A1 | 12/2015 | Hu et al. |
| 2016/0034157 A1 | 2/2016 | Vranjes et al. |
| 2016/0054881 A1 | 2/2016 | Yoshida et al. |
| 2016/0077685 A1 | 3/2016 | Fang et al. |
| 2016/0155410 A1 | 6/2016 | Nam |
| 2016/0162150 A1 | 6/2016 | Patel et al. |
| 2016/0162240 A1 | 6/2016 | Gu et al. |
| 2016/0170617 A1 | 6/2016 | Shi et al. |
| 2016/0179289 A1 | 6/2016 | Takamura et al. |
| 2016/0270656 A1* | 9/2016 | Samec ................... A61B 3/085 |
| 2016/0334975 A1 | 11/2016 | Takeuchi et al. |
| 2017/0060319 A1 | 3/2017 | Seo et al. |
| 2017/0097141 A1 | 4/2017 | Hyodo et al. |
| 2017/0097746 A1 | 4/2017 | Doray et al. |
| 2017/0180678 A1 | 6/2017 | Fish et al. |
| 2017/0185037 A1* | 6/2017 | Lee ....................... G03H 1/2205 |
| 2017/0255320 A1 | 9/2017 | Kumar et al. |
| 2018/0196480 A1 | 7/2018 | Murphy |
| 2018/0329580 A1 | 11/2018 | Aurongzeb et al. |

OTHER PUBLICATIONS

"International Search Report and Written Opinion Issued in PCT Application No. PCT/US18/038383", dated Sep. 28, 2018, 12 Pages.

"International Search Report and Written Opinion Issued in PCT Application No. PCT/US18/038393", dated Oct. 10, 2018, 17 Pages.

"International Search Report and Written Opinion Issued in PCT Application No. PCT/US18/038394", dated Sep. 25, 2018, 11 Pages.

"Non Final Office Action Issued in U.S. Appl. No. 15/680,849", dated Jan. 10, 2019, 27 Pages.

"Final Office Action Issued in U.S. Appl. No. 15/680,849", dated May 23, 2019, 25 Pages.

"Applicant Initiated Interview Summary Issued in U.S. Appl. No. 15/680,849", dated Jul. 12, 2019, 5 Pages.

* cited by examiner

MULTI-DISPLAY DEVICE USER INTERFACE MODIFICATION

BACKGROUND

Computer devices can be coupled to any suitable number of display screens. In some examples, large display screens can depict a user interface of the computer device over a large area. Alternatively, multiple smaller display screens can display extensions of a common user interface. In some examples, application windows and operating system task bars can be viewed by a user interface displayed with multiple display devices. In some examples, the multi-display device environment can distort or alter an image or user interface displayed via two or more display devices.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for modifying a user interface displayed in a multi-display device user interface that includes a processor and a memory to store a plurality of instructions that, in response to an execution by the processor, cause the processor to detect a number of display screens coupled to the system. The plurality of instructions can also cause the processor to split an image to generate sub-images based on the number of display screens and a bezel size corresponding to each of the display screens, the sub-images to exclude portions of the image corresponding to the bezel size of each of the display screens. Additionally, the plurality of instructions can cause the processor to resize each of the sub-images based on a display size of each of the display screens and display the image by transmitting the sub-images to the display screens.

In another embodiment, a method for modifying a multi-display device user interface can include detecting a number of display screens coupled to the system. The method can also include splitting an image to generate sub-images based on the number of display screens and a bezel size corresponding to each of the display screens, the sub-images to exclude portions of the image corresponding to the bezel size of each of the display screens. Additionally, the method can include resizing each of the sub-images based on a display size of each of the display screens and displaying the image by transmitting the sub-images to the display screens.

In yet another embodiment, one or more computer-readable storage media for modifying a user interface in a multi-display device environment can include a plurality of instructions that, in response to execution by a processor, cause the processor to detect a number of display screens coupled to the system. The plurality of instructions can also cause the processor to split an image to generate sub-images based on the number of display screens and a bezel size corresponding to each of the display screens, the sub-images to exclude portions of the image corresponding to the bezel size of each of the display screens. Furthermore, the plurality of instructions can cause the processor to resize each of the sub-images based on a display size of each of the display screens and display the image by transmitting the sub-images to the display screens.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

User interfaces can be generated using various techniques. For example, a user interface can include any suitable number of applications being executed, operating system features, and the like. In some embodiments, a display screen can display large user interfaces that may include application windows spread over large distances. Additionally, multiple display screens can be electronically coupled to one or more systems to provide a representation of a user interface across the multiple display screens. Accordingly, images that span two or more display devices can be distorted or skewed because the bezels of display devices and spaces between display devices interrupt a contiguous view of the image.

Techniques described herein provide a system for modifying a user interface in a multi-display device environment. A user interface, as referred to herein, can include any suitable number of application windows, operating system features, or any combination thereof. The application windows can provide a graphical user interface for an actively executed application that is viewable via a display screen. In some embodiments, the system can detect a number of display screens coupled to the system. The system can also split an image to generate sub-images based on the number of display screens and a bezel size corresponding to each of the display screens. In some examples, the sub-images exclude portions of the image corresponding to the bezel size of each of the display screens. In some embodiments, the system can also resize each of the sub-images based on a display size of each of the display screens. Furthermore, the system can display the image by transmitting each of the sub-images to a separate display screen.

The techniques described herein enable modifying a user interface in a multi-display device environment based on bezel sizes of display devices and spaces between display devices. For example, the techniques enable displaying a user interface across two or more display devices and compensating for a distance between edges of the display screens within the display devices.

Figure 1:
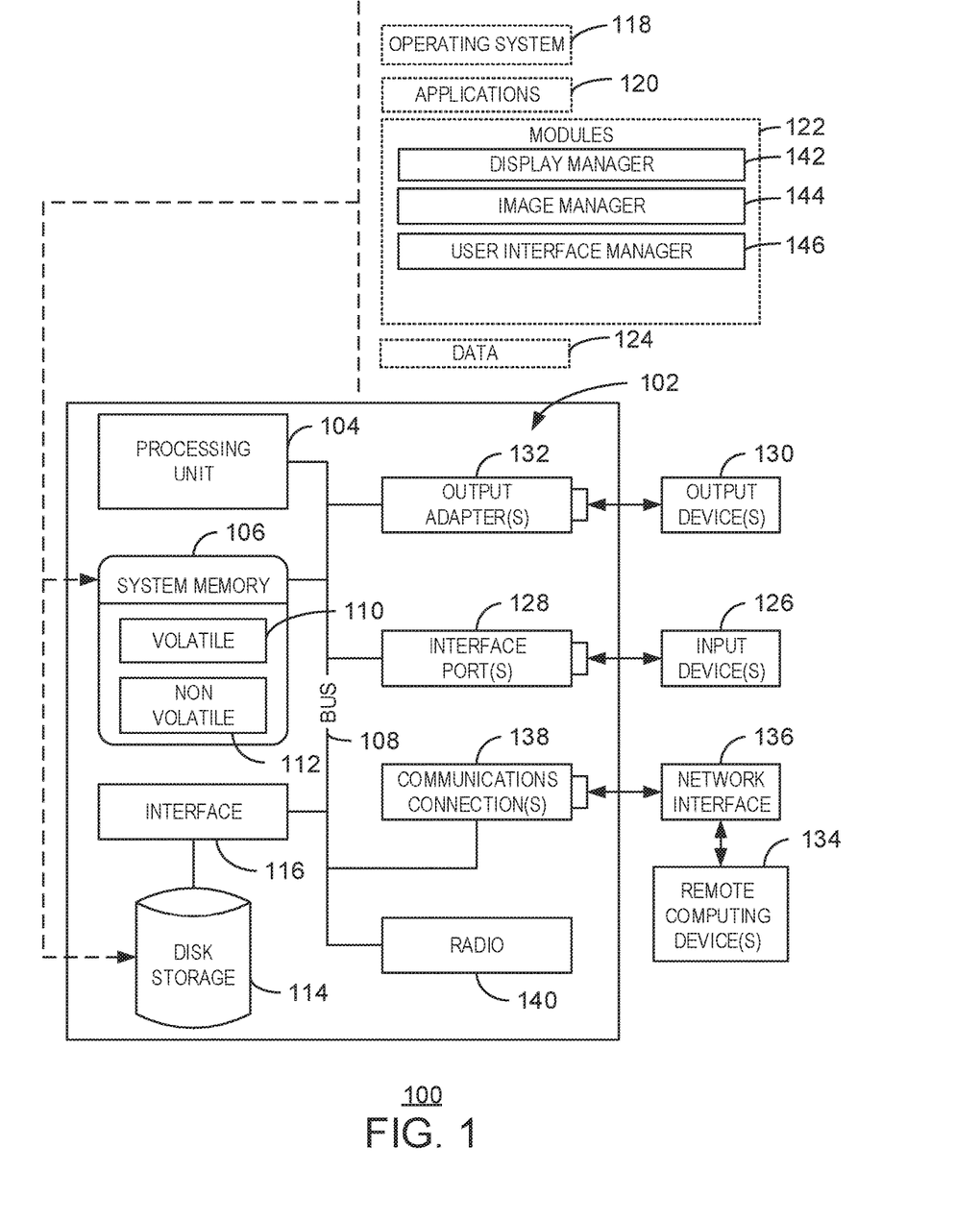
FIG. 1 is a block diagram of an example of a computing system that can modify a user interface displayed in a multi-display device environment.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can modify a user interface in a multi-display device environment. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

In some embodiments, a unified extensible firmware interface (UEFI) manager or a basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a display manager 142, an image manager 144, and a user interface manager 146. In some embodiments, the display manager 142 can detect a number of display screens coupled to a system. In some embodiments, the image manager 144 can split an image to generate sub-images based on the number of display screens and a bezel size corresponding to each of the display screens. In some examples, the sub-images exclude portions of the image corresponding to the bezel size of each of the display screens. In some embodiments, the image manager 144 can also resize each of the sub-images based on a display size of each of the display screens. Furthermore, the user interface manager 146 can display the image by transmitting each of the sub-images to a separate display screen.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the display manager 142, image manager 144, and user interface manager 146 may be partially, or entirely, implemented in hardware and/or in the processing unit (also referred to herein as a processor) 104. For example, the functionality may be implemented with an application specific integrated circuit, in logic implemented in the processing unit 104, or in any other device.

Figure 2:
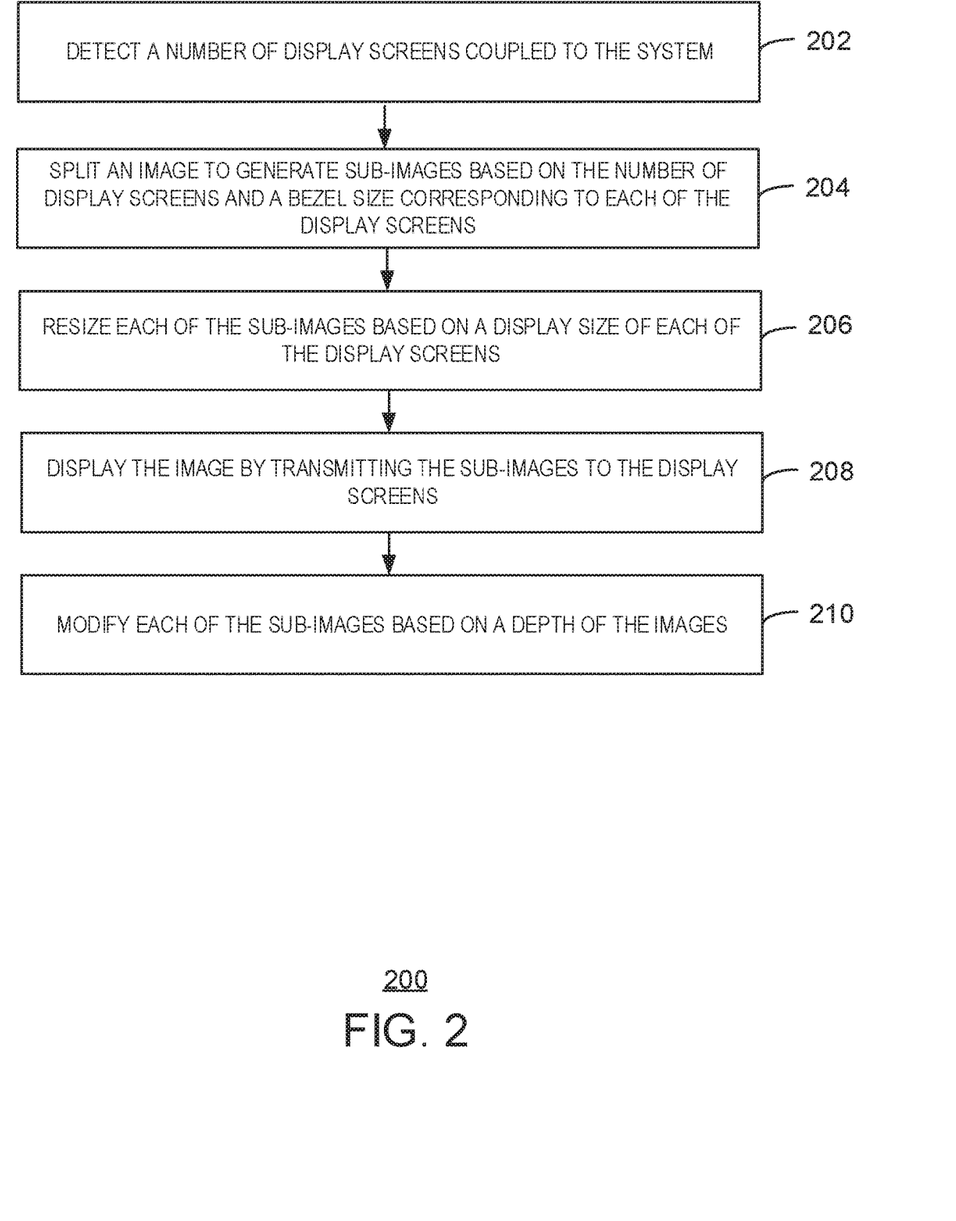
FIG. 2 is a process flow diagram of an example method for modifying a user interface displayed in a multi-display device environment.

FIG. 2 is a process flow diagram of an example method for modifying a user interface in a multi-display device environment. The method 200 can be implemented with any suitable computing device, such as the computing system 102 of FIG. 1.

At block 202, a display manager 142 can detect a number of display screens coupled to the system. In some embodiments, the plurality of display screens can include two or more display screens attached to a single device or one or more display screens attached to multiple devices. For example, a computing device may be electronically coupled to multiple display screens. Alternatively, a tablet computing device, a laptop device, and a mobile device may each be electronically coupled to separate display screens and a combination of the display screens for the tablet computing device, laptop device, and mobile device may be paired to display a user interface. In some embodiments, any two or more computing devices can be paired to display a user interface. For example, display screens for an augmented reality device, a projector device, a desktop computing system, a mobile device, a gaming console, a virtual reality device, a holographic projection display, or any combination therefore, can be combined to display a user interface. In some examples, the display screens can reside within a virtual reality headset. In some embodiments, at least one of the display screens can correspond to a virtual desktop. In some examples, one device can be coupled to a single display screen and a paired device can be coupled to multiple display screens.

At block 204, an image manager 144 can split an image to generate sub-images based on the number of display screens and a bezel size corresponding to each of the display screens. The image can include a background image to be displayed by a user interface of an operating system, an application window associated with an executed application to be displayed across several display screens, a user interface image comprising multiple application windows and an operating system task bar, or any other suitable image. In some examples, the sub-images can exclude portions of the image corresponding to the bezel size of each of the display screens. For example, the image manager 144 can detect the bezel size surrounding each display screen in a display device based on user input or via information captured by a camera coupled to the system. In some examples, the image manager 144 can detect a bezel size for each display device based on a hardware identifier, a driver file, or from any other suitable predetermined storage location for hardware information corresponding to a display device. In some embodiments, the bezel of each display device can be different. For example, different types of display devices with different bezel sizes can be coupled to a system. The image manager 144 can exclude a portion of the image corresponding to the bezel of each display device. For example, the image manager 144 can modify a size of the user interface to be displayed so that the user interface corresponds to a size of the display screens attached to a device, the bezels of the display devices that include the display screens, and spaces between the display devices. In some examples, the portions of the image corresponding to the region of the modified user interface associated with a bezel of a display device or a space between display devices can be excluded. In some embodiments, the image manager 144 can detect a portion of the image corresponding to a space between display devices based on a camera coupled to the system that detects a physical location of each display device and a size of each display screen in relation to each display device. In some examples, the image manager 144 can detect spaces between display devices using any suitable acoustic sensor such as a Doppler sensor, among others. In some embodiments, the image manager 144 can detect spaces between display devices based on user configured entries or configuration information corresponding to static arrangements of display devices in fixed positions.

At block 206, the image manager 144 can resize each of the sub-images based on a display size of each of the display screens. In some embodiments, each sub-image can be re-sized so that an image is displayed at a constant size or ratio across each display screen. In some examples, the image manager 144 can re-size the sub-images based on a smallest display size of the display screens. In some examples, the image manager 144 can resize each of the sub-images based on a single aspect ratio to be maintained across the display screens as one contiguous surface.

At block 208, the user interface manager 146 can display the image by transmitting each of the sub-images to a separate display screen. In some examples, the user interface manager 146 can display the image with any suitable number of display screens coupled to a system. For example, the user interface manager 146 can display the image by transmitting each of the sub-images to a subset of display screens coupled to a system or all of the display screens couple to a system.

At block 210, the user interface manager 146 can modify each of the sub-images based on a depth of the image. For example, a depth of the image being displayed can be modified so that the image is to appear farther away or closer to a user. The user interface manager 146 can modify or adjust the sub-images based on the depth of the image by removing more or less of the sub-images corresponding to the bezel size of the display devices and spaces between display devices.

In some examples, the user interface manager 146 can detect a modification to the depth of an image being displayed based on a detected control gesture. In some embodiments, the control gesture can include a touch gesture on one or more of the display screens coupled to the system. The control gesture can enable shifting a perspective of an image displayed within the user interface. For example, the control gesture can enable shifting a background image of the user interface to the left, right, up, or down. As a result of the control gesture, the user interface can be modified so that the display image shifts and new regions of the image are excluded from being viewed based on the bezels and spacing of display screens.

In some examples, the control gesture can include any number of fingers or any other portion of a hand or hands interacting with a display screen. For example, the control gesture can include a one finger touch of the display screen, a two finger touch of the display screen, or any additional number of fingers touching the display screen. In some embodiments, the control gesture can include two hands contacting a display screen within a size and shape of a region of the display screen in which a control gesture can be detected. In some examples, the area of the region corresponds to any suitable touch of a display screen. For example, a first finger touching the display screen can indicate that additional fingers or hands touching the display screen can be considered part of the control gesture within a particular distance from the first finger contact. In some embodiments, the control gesture can also include a temporal component. For example, the control gesture may include any number of fingers or hands contacting the display screen within a particular region within a particular time frame. In some examples, a delay between touching two fingers to the display screen can result in separate control gestures being detected.

In some embodiments, the display screen can extrapolate a control gesture based on a movement proximate a display screen. For example, the user interface manager 146 can use cameras coupled to a system to detect a hover gesture proximate a projection display. The hover gesture can be any suitable contactless gesture targeting portions of the display screen. The user interface manager 146 can extrapolate or determine the location of the display screen being selected based on the hover gesture.

Still at block 210, in some embodiments, the user interface manager 146 can generate a user interface based on a plurality of rules corresponding to a layout of the user interface. The plurality of rules can indicate how to display a modified user interface. For example, the user interface can be generated in relation to other visual elements such as an application launcher, an application switcher, and a window list, among others. An application launcher, as referred to herein, can include a list of executable applications installed on a system, a list of recently accessed applications installed on the system, recommended applications to be installed on the system, and the like. In some examples, the application launcher can include commands that can access programs, documents, and settings. These commands can include a search function based on locally stored applications and files, a list of documents available locally on a device or on a remote server, a control panel to configure components of a device, power function commands to alter the power state of the device, and the like. An application switcher, as referred to herein, can include a link to a digital assistant, a task view illustrating all open applications, a set of icons corresponding to applications being executed, and various icons corresponding to applications and hardware features that are enabled each time a device receives power. In some embodiments, any of the features from the application switcher or application launcher can be included in the modified user interface.

In one embodiment, the process flow diagram of FIG. 2 is intended to indicate that the blocks of the method 200 are to be executed in a particular order. Alternatively, in other embodiments, the blocks of the method 200 can be executed in any suitable order and any suitable number of the blocks of the method 200 can be included. Further, any number of additional blocks may be included within the method 200, depending on the specific application. In some embodiments, the method 200 can include detecting a location of the at least two display screens has been modified and modifying the excluded portion of the sub-images based on the modified location.

Figure 3:
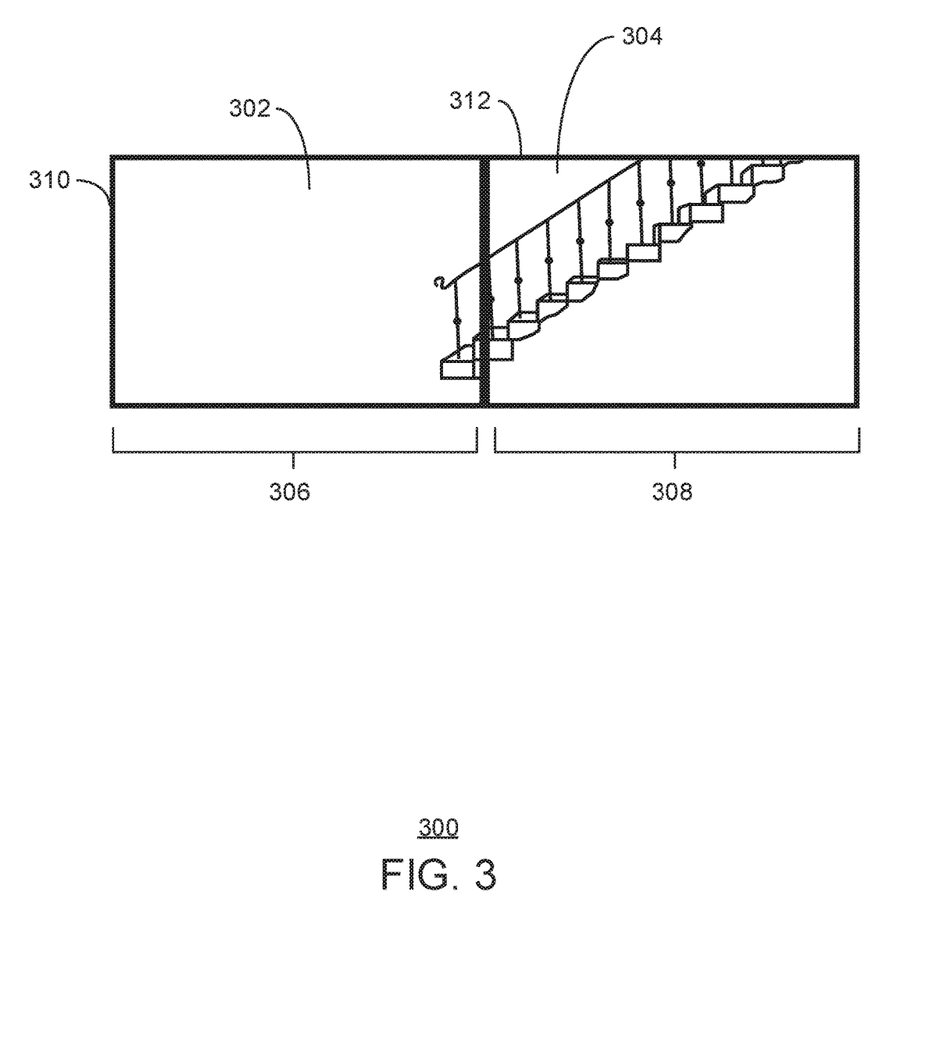
FIG. 3 is an example block diagram illustrating a modified user interface displayed in a multi-display device environment.

FIG. 3 is an example block diagram illustrating a user interface in a multi-display device environment. In the user interface 300, two display screens 302 and 304 display a background image. The display screens 302 and 304 can reside within display devices 306 and 308 respectively, which can include bezels 310 and 312. As discussed above, portions of the background image can be excluded based on the bezels 310 and 312 of the display devices 306 and 308. In the example of FIG. 3, the display devices 306 and 308 are adjacent to one another without spaces. In some examples, any spaces between the display devices 306 and 308 can also be used to modify the background image. The background image of user interface 300 includes an image of a side perspective of a staircase. The user interface 300 prevents any distortion of the image between the display devices 306 and 308 by excluding portions of the image corresponding to the bezels 310 and 312 of the display devices 306 and 308. In examples that did not modify the user interface 300, the background image would have distortion, such as uneven railing along the staircase.

It is to be understood that the block diagram of FIG. 3 is not intended to indicate that the user interface 300 contain all of the components shown in FIG. 3. Rather, the user interface 300 can include fewer or additional components not illustrated in FIG. 3 (e.g., additional application windows, etc.). In some embodiments, an image displayed by the user interface 300 can be generated based on rules. For example, the rules can indicate a location and size of the image based on properties of the display devices in a system. In some examples, the rules can be written in an Extensible Application Markup Language (XAML), HTML, and the like, to imperatively or declaratively describe the rules which result in the creation of the image in the user interface. In some examples, a background image of user interface 300 can be displayed by display devices oriented in a portrait mode or a landscape mode.

Figure 4:
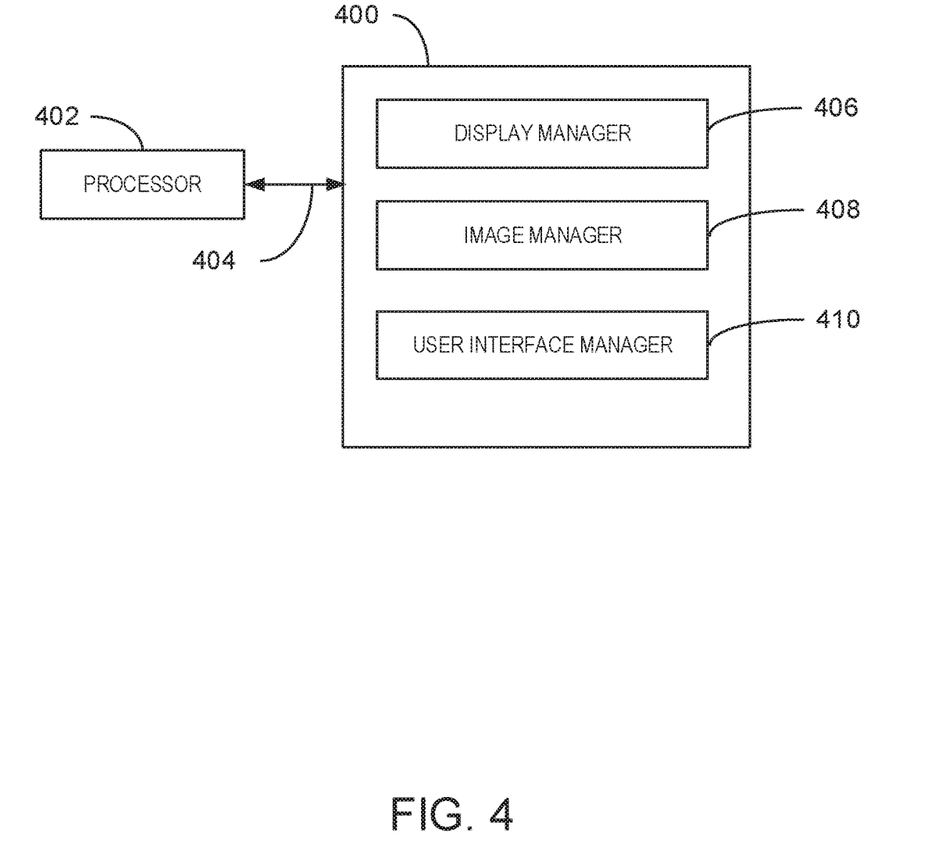
FIG. 4 is a block diagram of an example computer-readable storage media that can modify a user interface displayed in a multi-display device environment.

FIG. 4 is a block diagram of an example computer-readable storage media that can modify a user interface in a multi-display device environment. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a display manager 406 that can detect a number of display screens coupled to the system. In some embodiments, an image manager 408 can split an image to generate sub-images based on the number of display screens and a bezel size corresponding to each of the display screens. In some examples, the sub-images exclude portions of the image corresponding to the bezel size of each of the display screens. In some embodiments, the image manager 408 can also resize each of the sub-images based on a display size of each of the display screens. Furthermore, a user interface manager 410 can display the image by transmitting each of the sub-images to a separate display screen.

It is to be understood that any number of additional software components not shown in FIG. 4 may be included within the tangible, computer-readable storage media 400, depending on the specific application.

Example 1

In one embodiment, a system for modifying a user interface displayed in a multi-display device user interface includes a processor and a memory to store a plurality of instructions that, in response to an execution by the processor, cause the processor to detect a number of display screens coupled to the system. The plurality of instructions can also cause the processor to split an image to generate sub-images based on the number of display screens and a bezel size corresponding to each of the display screens, the sub-images to exclude portions of the image corresponding to the bezel size of each of the display screens. Additionally, the plurality of instructions can cause the processor to resize each of the sub-images based on a display size of each of the display screens and display the image by transmitting the sub-images to the display screens.

Alternatively, or in addition, the plurality of instructions can cause the processor to modify each of the sub-images based on a depth of the image. Alternatively, or in addition, the plurality of instructions can cause the processor to detect the number of display screens based on information captured by a camera coupled to the system. Alternatively, or in addition, the image comprises a background image for an operating system. Alternatively, or in addition, the image comprises a user interface for an application executed by an operating system. Alternatively, or in addition, the plurality of instructions can cause the processor to resize the sub-images based on a smallest display size of the display screens. Alternatively, or in addition, the plurality of instructions can cause the processor to detect a space between at least two of the display screens and exclude a portion of the sub-images corresponding to the space between the at least two display screens. Alternatively, or in addition, the plurality of instructions can cause the processor to detect a control gesture from at least two of the display screens. Alternatively, or in addition, the display screens reside in a virtual reality headset. Alternatively, or in addition, the display screens comprise at least one holographic projection display. Alternatively, or in addition, the plurality of instructions can cause the processor to detect a hover gesture proximate a projection display.

Example 2

In another embodiment, a method for modifying a multi-display device user interface can include detecting a number of display screens coupled to the system. The method can also include splitting an image to generate sub-images based on the number of display screens and a bezel size corresponding to each of the display screens, the sub-images to exclude portions of the image corresponding to the bezel size of each of the display screens. Additionally, the method can include resizing each of the sub-images based on a display size of each of the display screens and displaying the image by transmitting the sub-images to the display screens.

Alternatively, or in addition, the method can include modifying each of the sub-images based on a depth of the image. Alternatively, or in addition, the method can include detecting the number of display screens based on information captured by a camera coupled to the system. Alternatively, or in addition, the image comprises a background image for an operating system. Alternatively, or in addition, the image comprises a user interface for an application executed by an operating system. Alternatively, or in addition, the method can include resizing the sub-images based on a smallest display size of the display screens. Alternatively, or in addition, the method can include detecting a space between at least two of the display screens and excluding a portion of the sub-images corresponding to the space between the at least two display screens. Alternatively, or in addition, the method can include detecting a control gesture from at least two of the display screens. Alternatively, or in addition, the display screens reside in a virtual reality headset. Alternatively, or in addition, the display screens comprise at least one holographic projection display. Alternatively, or in addition, the method can include detecting a hover gesture proximate a projection display.

Example 3

In yet another embodiment, one or more computer-readable storage media for modifying a user interface in a multi-display device environment can include a plurality of instructions that, in response to execution by a processor, cause the processor to detect a number of display screens coupled to the system. The plurality of instructions can also cause the processor to split an image to generate sub-images based on the number of display screens and a bezel size corresponding to each of the display screens, the sub-images to exclude portions of the image corresponding to the bezel size of each of the display screens. Furthermore, the plurality of instructions can cause the processor to resize each of the sub-images based on a display size of each of the display screens and display the image by transmitting the sub-images to the display screens.

Alternatively, or in addition, the plurality of instructions can cause the processor to modify each of the sub-images based on a depth of the image. Alternatively, or in addition, the plurality of instructions can cause the processor to detect the number of display screens based on information captured by a camera coupled to the system. Alternatively, or in addition, the image comprises a background image for an operating system. Alternatively, or in addition, the image comprises a user interface for an application executed by an operating system. Alternatively, or in addition, the plurality of instructions can cause the processor to resize the sub-images based on a smallest display size of the display screens. Alternatively, or in addition, the plurality of instructions can cause the processor to detect a space between at least two of the display screens and exclude a portion of the sub-images corresponding to the space between the at least two display screens. Alternatively, or in addition, the plurality of instructions can cause the processor to detect a control gesture from at least two of the display screens. Alternatively, or in addition, the display screens reside in a virtual reality headset. Alternatively, or in addition, the display screens comprise at least one holographic projection display. Alternatively, or in addition, the plurality of instructions can cause the processor to detect a hover gesture proximate a projection display.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for modifying a multi-display device user interface, comprising:
   a processor; and
   a memory to store a plurality of instructions that, in response to an execution by the processor, cause the processor to:
   detect a number of display screens coupled to the system;
   detect a space between at least two of the display screens;
   split an image to generate sub-images based on the number of display screens and a bezel size corresponding to each of the display screens, the sub-images to exclude portions of the image corresponding to the bezel size of each of the display screens and a portion of the sub-images corresponding to the space between the at least two display screens;
   resize each of the sub-images based on a display size of each of the display screens; and
   display the image by transmitting the sub-images to the display screens.

2. The system of claim 1, wherein the plurality of instructions cause the processor to modify each of the sub-images based on a depth of the image.

3. The system of claim 1, wherein the plurality of instructions cause the processor to detect the number of display screens based on information captured by a camera coupled to the system.

4. The system of claim 1, wherein the image comprises a background image for an operating system.

5. The system of claim 1, wherein the image comprises a user interface for an application executed by an operating system.

6. The system of claim 1, wherein the plurality of instructions cause the processor to resize the sub-images based on a smallest display size of the display screens.

7. The system of claim 1, wherein the plurality of instructions cause the processor to:
   detect a location of the at least two display screens has been modified; and
   modify the excluded portion of the sub-images based on the modified location.

8. The system of claim 1, wherein the plurality of instructions cause the processor to detect a control gesture from at least two of the display screens.

9. The system of claim 1, wherein the display screens reside in a virtual reality headset.

10. The system of claim 1, wherein the display screens comprise at least one holographic projection display.

11. The system of claim 1, wherein the plurality of instructions cause the processor to detect a hover gesture proximate a projection display.

12. A method for modifying a multi-display device user interface, comprising:
    detecting a number of display screens coupled to a system;
    detecting a space between at least two of the display screens;
    splitting an image to generate sub-images based on the number of display screens and a bezel size corresponding to each of the display screens, the sub-images to exclude portions of the image corresponding to the bezel size of each of the display screens and a portion of the sub-images corresponding to the space between the at least two display screens;
    resizing each of the sub-images based on a display size of each of the display screens; and
    displaying the image by transmitting the sub-images to the display screens.

13. The method of claim 12, comprising modifying each of the sub-images based on a depth of the image.

14. The method of claim 12, comprising detecting the number of display screens based on information captured by a camera coupled to the system.

15. The method of claim 12, comprising resizing the sub-images based on a smallest display size of the display screens.

16. The method of claim 12, comprising detecting a control gesture from at least two of the display screens.

17. The method of claim 12, wherein the display screens reside in a virtual reality headset.

18. One or more computer-readable storage media for modifying a user interface in a multi-display device environment, wherein the one or more computer-readable storage media comprise a plurality of instructions that, in response to execution by a processor, cause the processor to:
    detect a number of display screens coupled to a system;
    detect a space between at least two of the display screens;
    split an image to generate sub-images based on the number of display screens and a bezel size corresponding to each of the display screens, the sub-images to exclude portions of the image corresponding to the bezel size of each of the display screens and a portion of the sub-images corresponding to the space between the at least two display screens;

resize each of the sub-images based on a display size of each of the display screens; and display the image by transmitting the sub-images to the display screens.

\* \* \* \* \*